United States Patent [19]

Pollman et al.

[11] Patent Number: 4,476,680
[45] Date of Patent: Oct. 16, 1984

[54] PRESSURE OVERRIDE CONTROL

[75] Inventors: Frederic W. Pollman; Stanley W. Crull, both of Ames, Iowa

[73] Assignee: Sundstrand Corporation, Rockford, Ill.

[21] Appl. No.: 66,499

[22] Filed: Aug. 14, 1979

[51] Int. Cl.³ ..................... F04B 49/08; F16H 39/46
[52] U.S. Cl. ....................................... 60/444; 60/443; 60/452; 417/213
[58] Field of Search ............... 417/213; 60/444, 452, 60/447, 443; 91/437

[56] References Cited
U.S. PATENT DOCUMENTS

| | | | |
|---|---|---|---|
| 1,974,138 | 9/1934 | Ferris et al. | |
| 3,659,963 | 5/1972 | Jennings | 417/213 |
| 3,908,519 | 9/1975 | Born et al. | 60/452 X |
| 3,986,358 | 10/1976 | Hoffman | 60/444 X |
| 4,055,047 | 10/1977 | Hara | 60/444 |
| 4,076,459 | 2/1978 | Adams et al. | 60/452 X |
| 4,116,002 | 9/1978 | Knapp et al. | 60/445 |
| 4,149,380 | 4/1979 | Nonnenmacher | 60/447 X |

OTHER PUBLICATIONS

Eaton Brochure "Override Control", Form EH 1078, Apr. 21, 1975.
Eaton Brochure "Pressure Compensator Control", Form EH 1083, Jan. 6, 1976.
Hydraulic, Inc. Publication "Rapid Response Torque Control", Jan. 28, 1977.
Norris, A., "Pressure Compensator Override", Publication of National Conference on Fluid Power, 1975.
Sauer Getriebe, "Pressure Compensator Control".

Primary Examiner—Irwin C. Cohen
Attorney, Agent, or Firm—Wood, Dalton, Phillips, Mason & Rowe

[57] ABSTRACT

A pressure override control which utilizes pump output flow for destroking of a variable displacement pump to minimize loss of power and generation of heat and which includes modifications to the displacement control valve for the pump and, particularly, the cross connection of displacement-controlling servo motors when the displacement control valve is in a neutral position with blocking of communication of said servo motors to a displacement control pressure and drain whereby the pump cannot be positioned in a maximum displacement position in response to certain system malfunctions in the power override control circuitry.

15 Claims, 2 Drawing Figures

PRESSURE OVERRIDE CONTROL

BACKGROUND OF THE INVENTION

This invention pertains to a fail-safe pressure override control for a variable displacement pump which utilizes the high flow available from the variable displacement pump to rapidly change the pump displacement when the system pressure exceeds a predetermined value and thus avoid undesirable pressure overshoots. The pressure override control includes certain components which may malfunction and means are provided to prevent any such malfunction from causing the pump displacement to move toward its maximum value in an uncontrollable manner.

A simple form of pressure control for a pump is utilization of a pressure relief valve in the pump output line which will open when a predetermined pressure is exceeded and permit flow of system fluid to tank. This system results in generation of heat in the fluid in the circuit and also loss of power. It is also known to limit maximum system pressure supplied by a variable displacement pump by destroking the pump to minimize the loss of power and heat generation. When this is done with control fluid supplied at a relatively low flow rate by a charge pump, the system pressure may overshoot a desirable value because the movement of the pump displacement mechanism may require too much time with the force available from fluid provided by the charge pump. In order to overcome this, various systems have been devised which port fluid from the main system pump outlet into the displacement-controlling servo mechanism to use the high flow available to rapidly destroke the pump and avoid undesirable overshoot of system pressure beyond a desirable value. These systems override the normal servo mechanism for displacement control and destroke the pump to the amount required to maintain the set pressure level.

Examples of the foregoing systems utilizing fluid from the system pump for reducing pump displacement include the systems shown in Ferris et al U.S. Pat. No. 1,974,138 and Jennings U.S. Pat. No. 3,659,963.

The literature discloses that at least two manufacturers offer pressure override controls for a variable displacement pump as usable in a hydrostatic circuit wherein the displacement of the pump can be controlled through a displacement control valve and when an excessive system pressure occurs, valve components will act to direct pump outlet flow to a displacement-controlling servo motor to cause reduction in displacement of the pump.

In all of the foregoing systems disclosed in the patents and literature referred to above, there is a possibility of certain system malfunctions which, upon occurrence thereof, would cause the override control to override the normal displacement control and which could drive the pump to its maximum displacement in an uncontrollable manner. This is inconvenient and, in some cases, could result in dangerous operation as when the hydrostatic transmission utilizing the pressure override control is used in the drive for a vehicle.

SUMMARY OF THE INVENTION

The pressure override control utilizes one or more pressure relief valves openable to permit flow of system flow from the pump for override control purposes when system pressure exceeds a predetermined value. The circuitry includes check valves in association with a charge pressure line. Failure of a pressure relief valve or a check valve could create a system malfunction which could drive the pump to its maximum displacement in an uncontrollable manner.

A primary feature of the invention disclosed herein is to provide a pressure override control for a variable displacement pump which has the advantages derived from power destroking thereof by use of fluid provided by the pump for destroking when system pressure exceeds a predetermined value and providing for fail-safe operation in the event of a malfunction in the pressure override system.

More specifically, the aforesaid primary feature embodies the construction and interconnection of the components of the system whereby such a failure of a pressure relief valve or a check valve will not have any adverse effect on the displacement of the pump.

In a system having a variable displacement pump with a movable displacement control member, it is common to utilize a servo mechanism for controlling the position of said member, including a pair of servo motors arranged to act in opposition to each other and interconnected with a displacement control valve which also has connections to a source of control pressure as provided by a charge pump and drain connections. A control element, such as an operator's handle or pedal, is movable to signal, as through a linkage, a movement of the displacement control valve which delivers charge pressure to one of the servo motors and connects the other servo motor to drain with resulting movement of the displacement control member. This movement, through interconnecting linkage to the displacement control element and the displacement control valve, returns the displacement control valve to a condition of balance wherein the displacement of the pump equals that signalled by the position of the displacement control element.

The override control functions in response to excessive system pressure to deliver flow from the system pump to the servo motor other than the servo motor which was last subjected to charge pressure and cause movement of the displacement control member in a displacement-reducing direction until system pressure is reduced to the predetermined value. In the prior art systems, the displacement control valve is normally spring-urged to a neutral position and the displacement control member is normally spring-urged to a zero displacement position. If the displacement control element, such as the handle or pedal is unrestrained and certain valve elements, such as a check valve or a pressure relief valve malfunction, charge pressure can be applied to a servo motor, as for example, upon start-up of the prime mover. This can cause the displacement control member to move to a maximum displacement position. In a transmission for a vehicle, this could cause unexpected vehicle movement, with resulting danger to an operator of the vehicle or nearby personnel.

The invention disclosed herein solves the foregoing problem by having a neutral position for the displacement control valve which cross-connects the servo motors and blocks communication thereof with both charge pressure and drain, whereby any malfunction of a check valve or pressure relief valve which causes application of charge pressure to a servo motor results in application of the pressure to both servo motors whereby there is no force applied to cause movement of the displacement control member.

In carrying out the foregoing, the displacement control valve has at least one normal position when said displacement control member is in a position to cause pumping action by the pump and wherein the override control may be effective to override the positioning effect of the displacement control valve and servo motors. Additionally, a neutral position different from said normal position has the servo motors cross-connected to each other and out of communication with a charge pressure source and drain connections to said displacement control valve.

An object of the invention is to provide a new and improved fail-safe pressure override control for a variable displacement pump.

Another object of the invention is to provide a fail-safe pressure override control for a hydrostatic transmission having a variable displacement pump in circuit with a motor by means of two fluid lines wherein existence of an excessive pressure in either of said lines reduces system pressure below a predetermined value.

Still another object of the invention is to provide a pressure override control for a variable displacement pump having a pair of displacement-controlling servo motors actuable individually for oppositely-varying pump displacement, a displacement control valve having a pair of fluid lines extended one to each of said servo motors for selective delivery of a control pressure to one of said lines and having a neutral position, a fluid conduit extended between a pump outlet fluid line and one of said servo motors, a normally closed pressure-responsive valve in said fluid conduit and openable when system pressure in said outlet fluid line exceeds a predetermined value to deliver fluid from said outlet fluid line to said one servo motor, the improvement wherein said displacement control valve has means interconnecting said pair of fluid lines and blocking communication thereof with control pressure and with drain when said displacement control valve is in said neutral position.

Still another object of the invention is to provide a pressure override control for a hydrostatic transmission having a variable displacement pump in circuit with a motor by means of two fluid lines, a charge pump for supplying oil to said circuit and for supplying control oil at a control pressure, a displacement control for said pump including a pair of servo motors arranged to act in opposition to each other and a displacement control valve having control pressure and drain connections and connected to said servo motors for selectively-applying control pressure to one or the other of said servo motors and connecting the other servo motor to drain comprising, a pair of branch fluid lines connected to said displacement control valve and one to each of said fluid lines and one to each of said servo motors, a pair of pressure relief valves connected one in each of said branch lines and being openable in response to system pressure in the associated fluid line of said circuit exceeding a predetermined value for directing oil from the circuit to the associated servo motor, said displacement control valve having a first position for maintaining said pump in a stroke at a desired displacement and having a second neutral position, said displacement control valve having means to block fluid communication between said servo motors in said first position and means to place said servo motors in communication in said neutral position but out of communication with the control pressure and drain connections.

DESCRIPTION OF THE PREFERRED EMBODIMENT

Figure 1:
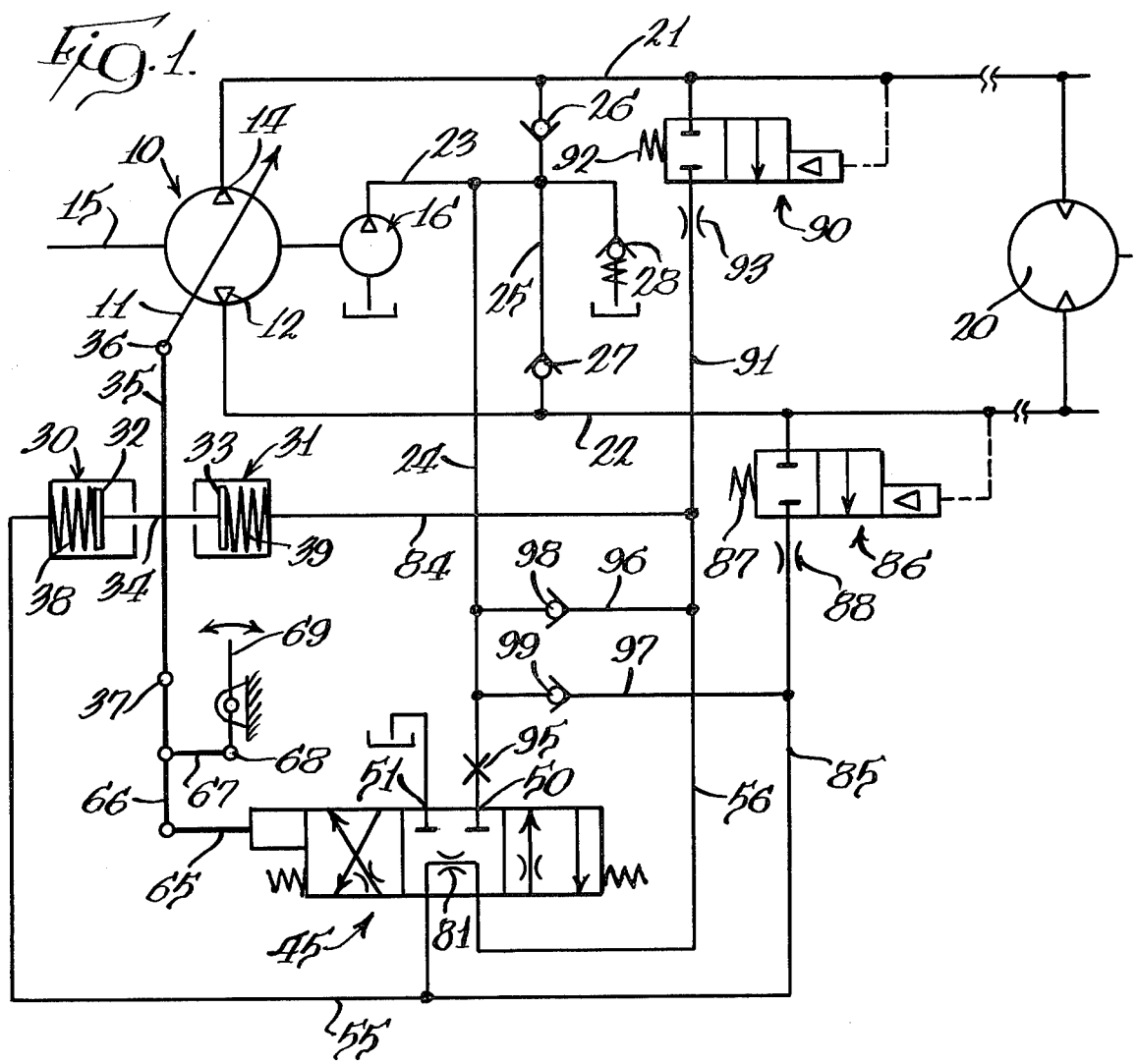
FIG. 1 is a schematic showing the pressure override control in association with a variable displacement pump in association with components of a hydrostatic transmission.

The pressure override control is shown schematically in FIG. 1 in association with a variable displacement pump, indicated generally at 10, which is of the variable displacement type. As an example, the pump 10 can be an axial piston unit, which is well known in the art, and which has a displacement control member 11, in the form of a movable swash plate which can have its position varied to either side of a zero displacement position. In an adjusted position between zero displacement and maximum displacement to one side of zero displacement, the flow is from a pump port 12. With the swash plate adjusted at the opposite side of zero displacement, the pump flow is from a port 14. The pump 10 may be driven by an input shaft 15 and the shaft also has a charge pump, indicated generally at 16, associated therewith for providing a source of oil at charge or control pressure for utilization by the servo mechanism associated with the pump for controlling displacement thereof.

For illustrative purposes, the pump 10 is shown in a hydrostatic transmission circuit wherein the pump 10 is associated with a motor, indicated generally at 20, which may be of a suitable type, with one example being an axial piston unit of either fixed or variable displacement. The hydrostatic transmission circuit has a pair of fluid lines 21 and 22 interconnecting the pump and motor, with the latter line being the pump outlet fluid line when the pump is discharging through port 12. The line 21 is the pump outlet fluid line when the pump is discharging through port 14. In the hydrostatic transmission, charge pump 16 has the additional function of supplying make-up oil to the circuit. The charge pump has an outlet line 23 which connects to a displacement control pressure line 24 and also to a line 25 connected between the fluid lines 21 and 22 of the circuit. A pair of check valves 26 and 27 in the line 25 permit flow from the charge pump to either of the fluid lines 21 and 22 when the oil therein is at a pressure less than that supplied by the charge pump but which prevent reverse flow from a high pressure line of the circuit. A relief valve 28 connects to the line 23 and limits the pressure in the charge pressure outlet line. The foregoing structure is typical of that utilized in a hydrostatic transmission and with additional circuitry associated therewith and well known in the art being omitted for clarity. The transmission can be used for a vehicle drive, such as a tractor drive, and the input shaft 15 would connect to the prime mover.

The displacement control servo mechanism includes a pair of servo motors 30 and 31, in the form of servo cylinders arranged to act in opposition to each other and each having a piston 32 and 33, respectively, commonly connected to a rod 34 which connects to a link 35 of a control linkage, with one end of the link being pivoted at 36 to the displacement control member 11 and the other end being pivotally connected at 37 to additional components of the linkage and which are to be described. Spring means are associated with the servo motor pistons 32 and 33 and, as shown by springs 38 and 39, respectively, which, in the absence of control pressure, act to locate the displacement control member 11 in a zero displacement position.

Figure 2:
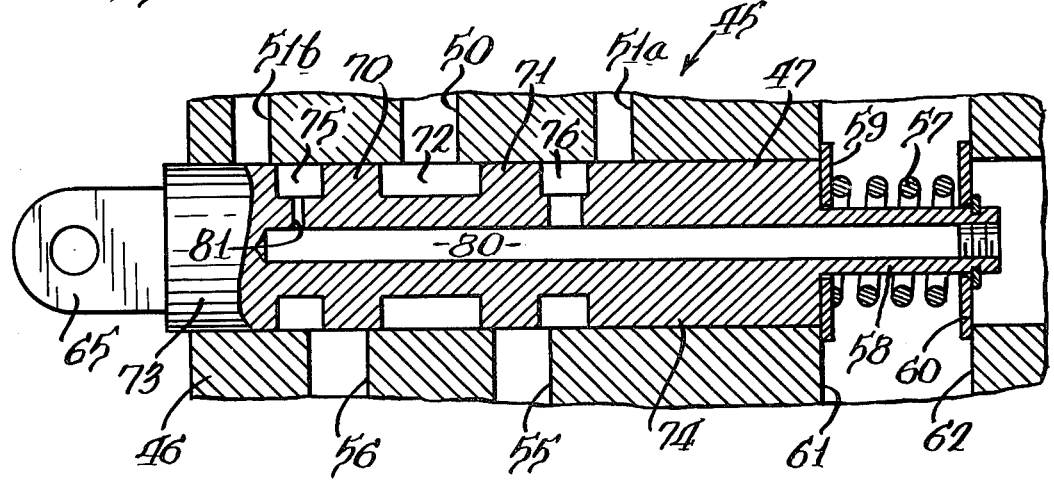
FIG. 2 is a vertical sectional view of the displacement control valve, shown schematically in FIG. 1, and showing said valve in a neutral position.

A displacement control valve, indicated generally at 45 and shown in circuit in FIG. 1 and in FIG. 2, has a body 46 with a bore in which a valve member 47, in the form of a spool valve, is longitudinally movable.

The displacement control valve has a passage 50 defining a connection to the control pressure line 24 which provides oil at charge pressure to the valve. Additionally, a connection to drain is shown at 51 in FIG. 1 which, in the actual valve construction, is in the form of a pair of drain lines 51a and 51b. A pair of fluid lines 55 and 56 extend between the displacement control valve and the servo motors 30 and 31, respectively, and terminate in passages in the body of the displacement control valve. The valve member 47 of the displacement control valve is spring-centered to a neutral position, shown in FIG. 2, by means of centering spring means including a spring 57 surrounding a reduced diameter stem 58 integral with the spool and extending from an end thereof and which coacts between a pair of plates 59 and 60 loosely mounted on the stem and acting against fixed surfaces 61 and 62, respectively, whereby, when the valve member 47 is free from restraint, the spring 57 can bring the valve spool to the neutral position.

The valve spool 47 has an exposed end 65 connectable to a link 66 which is pivotally connected to the link 35 at the pivot connection 37, previously referred to. Intermediate its ends, the link 66 is pivotally connected to a link 67 which is pivotally connected at 68 to a displacement control element 69 which may be in the form of a pivoted pedal or handle which is actuable to set the displacement of the transmission.

The valve spool 47 has a pair of longitudinally-spaced central lands 70 and 71 defining an annular groove 72 therebetween. Additionally, a pair of end lands 73 and 74 are in spaced relation to the central lands 70 and 71, respectively, and define annular grooves 75 and 76 therebetween. The annular grooves 75 and 76 are interconnected by an internal flow passage 80 within the valve spool and which has a flow restriction 81 therein. The orifice 81 is shown symbolically in three different flow connections in FIG. 1. Alternative to having the orifice 81 between the flow passage 80 and the annular groove 75, similar orifices could either be in the drain lines 51a and 51b or the fluid lines 55 and 56.

The fluid line 55 connects directly to the servo motor 30, while the fluid line 56 connects to a line 84 which connects to the servo motor 31. With this structure and as more particularly described hereinafter, it is possible to establish a desired displacement for the pump 10 through the servo mechanism, including desired positioning of the displacement control element 69 which, through the linkage, causes a shift of the valve spool 47 to establish hydraulic connections which cause the servo motors to effect a shift in the position of the displacement control member 11 and which, through the linkage, repositions the valve spool 47.

The pressure override control functions to vary the displacement of the pump 10 to reduce system pressure. That is, the pressure of oil in whichever of the fluid lines 21 and 22 is at relatively high pressure. The override control includes a fluid conduit, or branch fluid line 85, which extends from the circuit fluid line 22 and connects with the fluid line 55 to interconnect circuit fluid line 22 with the servo cylinder 30 and the connection being under the control of a pressure relief valve, indicated generally at 86. The pressure relief valve is connected into the fluid conduit 85 and, as shown, has a normally closed position blocking flow between the circuit fluid line 22 and the fluid line 55. The pressure relief valve is responsive to the pressure in circuit fluid line 22 and, when this pressure exceeds the setting of the relief valve spring 87, the pressure relief valve can move to an open position whereby flow from the pump port 12 can communicate directly with the servo motor 30. An orifice 88 in the fluid conduit 85 limits the initial surge of such flow.

A second pressure relief valve, indicated generally at 90, is connected into a fluid conduit or branch fluid line 91, which is an extension of the fluid line 56 and which acts to connect circuit fluid line 21 with the servo motor 31 through the line 84. The pressure relief valve 90 has the same action as the pressure relief valve 86 and is normally closed. However, when the pressure in circuit fluid line 21 exceeds a predetermined value, as set by a spring 92, the pressure relief valve can open to permit flow from circuit fluid line 21 to the servo motor 31 with a flow surge being limited by a flow-restricting orifice 93.

The charge pressure control line 24 has an optionally usable flow-restricting orifice 95 for restricting the flow rate through the displacement control valve 45 and, additionally, connects to the branch fluid lines 56 and 85 through a pair of lines 96 and 97, each of which has a check valve 98 and 99, respectively, which prevent fluid flow from the charge pressure control line to said branch fluid lines, but which permit flow in the opposite direction.

In considering the various modes of operation, the conventional displacement control action of the servo mechanism will first be described.

The displacement control element 69 can be moved in a clockwise direction, and as viewed in FIG. 1, to cause the pump 10 to move to a displacement position and cause flow through the port 12, with the circuit line 22 being the high pressure line. This action results from movement of the control element 69 acting through the linkage to shift the valve spool 47 to the left from the position shown in FIG. 2 which first opens the annular groove 75 to the drain line 51b. The annular groove 75 still communicates with the passage 56 for connection thereof to drain and the flow line 55 is also connected to drain through the internal flow passage 80 and the flow restriction 81. As the valve spool 47 moves further to the left, the land 70 locks fluid line 56 from connection to drain and it is then opened to charge pressure at the fluid connection 50. Oil at control pressure then passes through fluid line 56 to the servo motor 31, moving it to the left, which laterally displaces the link 35 and rotates the displacement control member 11 in a direction to move the pump into stroke. This same motion gradually moves the valve spool 47 toward the right, closing off charge pressure flow to the line 56 when the displacement-controlling member (swash plate) 11 has reached its proper position. In this position, land 71 does not obstruct fluid line 55 from communication with annular groove 76 and which communicates with the flow passage 80 whereby fluid line 55 is in communication with the drain passage 51b through the flow-restricting orifice 81. The land 70 effectively blocks all flow communication to the fluid line 56.

With the displacement for the pump 10 set as described in the preceding paragraph, the pump is delivering oil to circuit line 22. If the pressure in this line rises above the setting of the relief valve 86, system oil derived from the pump can flow through the relief valve 86, the flow-restricting orifice 88, and through fluid conduit 85 to fluid line 55 whereby system oil is applied directly to the servo motor 30. This flow also attempts to pass through the displacement control valve 47 to drain but the flow thereof is restricted by the flow-restricting orifice 81 which results in a rise in pressure in fluid line 55 and in servo motor 30. The rise in pressure in the servo motor along with other forces, in combination, act to reduce the angle of the swash plate 11 as the piston 32 of the servo motor 30 moves to the right. The additional forces include the force of the spring 38 in the servo motor 30 and also the moment of force applied to the swash plate by the pumping action in the pump. The stroke-reducing movement of swash plate 11 will move the valve spool 47 to the left, fully porting charge pressure in control pressure line 50 to the fluid line 56 to increase the pressure from some prior intermediate level. The pressure in line 55, therefore, continues to rise and act in opposition to pressure in fluid line 56 until the swash plate has reached the desired position where system pressure in circuit line 22 is maintained at the desired setting.

The actual value of the pressure in line 55 is usually considerably less than charge pressure but is still effective in modifying displacement in acting at a servo motor because of the force created by a servo spring and the swash plate moment.

The foregoing describes the pressure override control acting when the pump is delivering fluid under pressure to the circuit line 22. When it is desired to have the system deliver fluid under pressure to the circuit fluid line 21, the displacement control element 69 is moved counterclockwise from the position shown in FIG. 1, and the displacement control valve spool 47 moves to the right from the position shown in FIG. 2. This initially places the annular groove 76 in communication with the drain line 51a which directly connects fluid line 55 to the drain line and indirectly connects fluid line 56 to the drain line through the annular groove 75 and the flow passage 80. Further movement of the valve spool to the right closes fluid line 55 off from communication with the drain line and then opens the fluid line to charge pressure through fluid line 50 with fluid line 56 continuing its connection to the drain line through the flow passage 80. This delivers charge pressure to fluid line 55 which is delivered to servo motor 30 and causes lateral shift of the link 35 to move the swash plate 11 to a position to cause flow from the pump port 14 and through fluid line 21. This movement of the swash plate acts to restore the displacement control valve spool 47 by movement to the left thereof, as viewed in FIG. 2, closing-off charge flow to fluid line 55 by land 71.

If a pressure above a predetemined value occurs in circuit fluid line 21, the relief valve 90 will open in response thereto and permit system fluid to flow through fluid conduit 91 and flow-restricting orifice 93 to the servo motor 31 and to fluid line 56. This flow attempts to reach the drain line 51a, but flow thereof is restricted by the flow-restricting orifice 81, resulting in a rise in pressure in line 56 and in the servo motor 31 whereby pressure increase therein as well as the force of the spring 39 and the stroke-reducing swash plate moments act to move the swash plate 11 in a stroke-reducing direction.

In a hydrostatic transmission, assuming that the pump 10 is set to pump fluid to the circuit line 22 and to have fluid therein at high pressure, it is possible to have the pump 10 acting as a motor, with the oil being delivered to circuit line 22, but actually being at a higher pressure in circuit line 21. In this situation, swash plate moments will be stroke-increasing and this, along with the override control, acts to increase swash plate angle, with the desired result of reducing the high pressure in circuit line 21. In a motoring condition when the pressure in line 21 exceeds the setting of the relief valve 90, system oil will pass into the fluid conduit 91 and the fluid line 56, raising the pressure thereof and acting on servo motor 31 to move the link 35 to the left. This causes the angle of swash plate 11 to increase with resulting decrease in pressure in circuit line 21. This action causes the valve spool 47 to move to the right to block connection between the charge pressure line 50 and the fluid line 56. However, the pressure in the latter line will remain high and will tend toward charge pressure as long as flow from relief valve 90 continues. The swash plate moments which are trying to increase the angle of the swash plate 11 as well as the pressure on the piston 33 of servo motor 31 are opposed only by the force of spring 38 in servo motor 30.

If the swash plate 11 moves far enough, it will cause the valve spool 47 to shift to the right even further and, at some point, the land 70 will open the fluid line 56 to drain by means of flow passage 80 and drain line 51a and land 71 will connect fluid line 55 with charge pressure in control line 50. Under this condition, the pressure in fluid lines 55 and 56 will be nearly equal to charge pressure, since the pressure in fluid line 56 is not allowed to exceed charge pressure to any great degree because of the check valve 98 in line 96 which connects fluid line 56 to the charge pressure control line 24. Even under this condition, the swash plate moment should be sufficient to overcome the force of spring 38 in the servo motor 30 and the pump will continue to have its stroke increased until either the pressure in circuit line 21 is maintained at the desired setting or the swash plate 11 rests against its maximum angle stop.

When the pump is set to deliver fluid from port 14 to circuit line 21 and a motoring action of the type described above occurs, with there being a higher pressure in circuit fluid line 22, then the pressure relief valve 86 may open upon excessive pressure and a similar type action will occur to cause the swash plate 11 to move to a displacement-increasing position.

In the pressure override control, there is a possibility of a malfunction in either of the pressure-relief valves 86 or 90 and either of the check valves 98 and 99. Such a malfunction can be serious in a situation, such as start-up of the transmission, when a prime mover connected to the input shaft 15 is started. This potential problem can arise because the displacement control valve is spring-centered to the neutral position shown in FIG. 2 and the springs in the servo motors 30 and 31 act to hold the swash plate 11 in a zero displacement position when not acted upon by pressure. With these conditions, if the displacement control element 69 is not restrained but is free to move, it has been possible in the prior art system that, upon start-up, charge pressure created by the charge pump 16 could pass through a defective check valve 98 or 99 or a defective pressure relief valve 86 or 90 by the connection of the charge pump to the circuit lines 21 and 22 and, thus, cause delivery of charge pressure to the particular servo motor 30 or 31 which is connected into the line which receives charge pressure through the defective element. Alternatively to one of the valve elements being defective, it is possible that such valve element is held in an open position by a particle in the oil.

In the prior system, the delivery of charge pressure to one of the servo motors 30 or 31 will cause movement of the swash plate 11 into a pump displacement condition and this can be a movement to maximum stroke position because of the opposing servo motor being connected to drain. The circuit disclosed herein provides fail-safe operation in avoiding the possible movement of the swash plate to maximum displacement position under the conditions set forth above because of the structure of the displacement control valve wherein the servo motors 30 and 31 are cross-connected when the displacement control valve is in the spring-centered neutral position of FIG. 2. As shown in FIG. 2, the fluid lines 55 and 56 which connect to the servo motors are cross-connected through the annular grooves 75 and 76 and the internal flow passage 80 having the flow-restricting orifice 81. Additionally, the fluid lines 55 and 56 are blocked from charge pressure by the central land 70 and 71 and are blocked from communication with the drain lines by end lands 73 and 74. With the construction, any leakage through check valve 98 or 99 or pressure relief valves 86 and 90 which would direct charge pressure to a servo motor also results in having the charge pressure applied to the other servo motor with the pressures in fluid lines 55 and 56 remaining equal and the servo motor springs 38 and 39 maintaining the swash plate 11 at neutral.

An additional condition to be considered is when the pump is at neutral and the operator attempts to place the pump into stroke when a check valve 98 and 99 or pressure relief valve 86 or 90 is leaking. This can result from being held open by a chip or particle or having spring breakage in the release pressure relief valves. In this situation, the fluid lines 55 and 56 will both be at charge pressure. Should the specific failure be either relief valve 86 or check valve 99 and if an operator moves the displacement control element 69 clockwise, as viewed in FIG. 1, the displacement control valve spool 47 moves to the left first porting oil from annular groove 75 to drain line 51b thus lowering the pressure in fluid line 56 to a small degree. This has a tendency to move the swash plate 11 into stroke in a direction opposite to the intended direction, thus moving valve spool 47 further to the left, closing fluid line 56 from the drain line, and connecting it to charge pressure at control line 50. This slight movement of the swash plate in the incorrect direction is only a minimal amount and as pressure in fluid line 56 rises to charge pressure, the movement of the swash plate is back toward neutral. In practice, if the control element 69 is moved sufficiently from its neutral position which causes the spool land 70 to move across the connection of fluid line 56 at the displacement control valve there is no observable motion into stroke in the incorrect direction. During this action, the pressure in fluid line 55 will take on a value dependent upon the degree of leakage across the failed check valve 99 or the failed pressure relief valve 86. With valve spool 47 moved to the left, fluid line 55 is connected to drain line 51b through internal flow passage 80 and flow-restricting orifice 81. If the leakage across either of the failed valves 99 or 86 is very small, the pressure in fluid line 55 would be low, due to the fact that oil can pass through the flow-restricting orifice 81 to drain and it will be possible for any pressure build-up in fluid line 56 to stroke the pump some degree in the proper direction. If the valves 99 or 86 have suffered a massive failure, such as a broken spring or large chip wedged into it so that no closure is occurring, the pressure in fluid lines 55 and 56 will remain at or near charge pressure and the swash plate will remain at neutral.

If the displacement control element 69 is moved in a counterclockwise direction attempting to establish pump displacement, the displacement control valve spool 47 will move to the right and oil from fluid line 56 will pass through the flow-restricting orifice 81 to the annular groove 76 and to drain line 51a, thus dropping the pressure in fluid line 56 and moving the swash plate in the proper direction and amount.

In the event there is a failure in either check valve 98 or relief valve 90, there would be similar, but opposite, action to that previously described.

With the structure described herein, it will be seen that a pressure override control is provided for a variable displacement pump which can have reversible output and with there being fast adjustment of pump displacement in the event of an excessive system pressure by using high volume flow from the pump to prevent pressure overshoots. Such a system has many desirable features. However, there are valves used in such a system which can fail or permit leakage which, in certain conditions of operation of known systems, can result in unexpected and possibly hazardous operation. The structure of the system disclosed herein including the particular structure of the displacement control valve avoids such hazards from system malfunctions.

We claim:

1. A pressure override control for a variable displacement pump having a pair of displacement-controlling servo motors actuable individually for oppositely-varying pump displacement, a displacement control valve having a pair of fluid lines extended one to each of said servo motors for selective delivery of a control pressure to one of said lines and having a neutral position, a fluid conduit extended between a pump outlet fluid line and one of said servo motors, a normally closed pressure-responsive valve in said fluid conduit and openable when system pressure in said outlet fluid line exceeds a predetermined value to deliver fluid from said outlet fluid line to said one servo motor, the improvement wherein said displacement control valve has means interconnecting said pair of fluid lines and blocking communication thereof with control pressure and with drain when said displacement control valve is in said neutral position.

2. A pressure override control as defined in claim 1 including means normally urging said displacement control valve to said neutral position.

3. A pressure override control as defined in claim 1 wherein a second fluid line connects to said pump, a second fluid conduit extended between said last-mentioned line and the other of said servo motors, and a second normally closed pressure-responsive valve in said second fluid conduit and openable in response to a predetermined pressure to deliver fluid from said second fluid line to said other servo motor.

4. A pressure override control as defined in claim 1 wherein said displacement control valve has a connection to control pressure and a connection to drain in addition to the connections to said pair of fluid lines and said means operative in neutral position includes a valve spool with a pair of spaced-apart lands interposed between said control pressure connection and said fluid line connections, additional lands blocking communication between said fluid line connections and the connection to drain, and a flow passage through the valve spool interconnecting said fluid lines.

5. A pressure override control as defined in claim 4 wherein said flow passage includes a flow-restricting orifice.

6. A pressure override control as defined in claim 5 wherein said displacement control valve has at least one displacement-controlling position different from said neutral position and wherein said flow passage connects said fluid conduit to drain.

7. A pressure override control as defined in claim 1 wherein said pump has a movable displacement control member positioned by said servo motors, a control element operable to establish a desired displacement of the pump, a linkage operatively interconnecting said displacement control member, said control element, and said displacement control valve, means yieldably urging said displacement control valve to said neutral position, and means associated with said servo motors yieldably urging said displacement control member to a neutral displacement position.

8. A pressure override control for a hydrostatic transmission having a variable displacement pump in circuit with a motor by means of two fluid lines, a charge pump for supplying oil to said circuit and for supplying control oil at a control pressure, a displacement control for said pump including a pair of servo motors arranged to act in opposition to each other and a displacement control valve having control pressure and drain connections and connected to said servo motors for selectively-applying control pressure to one or the other of said servo motors and connecting the other servo motor to drain comprising, a pair of branch fluid lines connected to said displacement control valve and one to each of said fluid lines and one to each of said servo motors, a pair of pressure relief valves connected one in each of said branch lines and being openable in response to system pressure in the associated fluid line of said circuit exceeding a predetermined value for directing oil from the circuit to the associated servo motor, said displacement control valve having a first position for maintaining said pump in stroke at a desired displacement and having a second neutral position, said displacement control valve having means to block fluid communication between said servo motors in said first position and means to place said servo motors in communication in said neutral position but out of communication with the control pressure and drain connections.

9. A pressure override control as defined in claim 8 wherein said pump has a movable displacement control member, a control element operable to establish a desired displacement of the pump, a linkage operatively interconnecting said displacement control member, said control element, said displacement control valve, and means yieldably urging said displacement control valve to said neutral position.

10. A pressure override control as defined in claim 8 wherein said displacement control valve has a valve member provided with an orificed passage which connects one of said branch fluid lines to said drain port when the displacement control valve is in said first position.

11. A pressure override control for a hydrostatic transmission having a variable displacement pump in circuit with a motor by means of two fluid lines, a charge pump for supplying oil to said circuit and for supplying control oil at a control pressure, a displacement control for said pump including a pair of servo motors arranged to act in opposition to each other and a displacement control valve having control pressure and drain connections and connected to said servo motors for selectively-applying control pressure to one or the other of said servo motors and connecting the other servo motor to drain comprising, a branch fluid line connected to said displacement control valve and to one of said fluid lines and one of said servo motors, a pressure relief valve connected in said branch line and openable in response to system pressure in said circuit exceeding a predetermined value for directing oil from the circuit to the associated servo motor, said displacement control valve having a first position for maintaining said pump in stroke at a desired displacement and having a second neutral position, said displacement control valve having means to block fluid communication between said servo motors in said first position and means to place said servo motors in communication in said neutral position but out of communication with said control pressure and drain connections.

12. A pressure override control for a hydrostatic transmission having a variable displacement pump in circuit with a motor by means of two fluid lines, a charge pump for supplying oil to said circuit and for supplying control oil at a control pressure to a control line, a displacement control for said pump including a pair of servo motors arranged to act in opposition to each other and a displacement control valve having a connection to said control line and drain connections and connected to said servo motors for selectively-applying control pressure to one or the other of said servo motors and connecting the other servo motor to drain comprising, a pair of branch fluid lines connected to said displacement control valve and one to each of said fluid lines and one to each of said servo motors, a pair of pressure relief valves connected one in each of said branch lines and being openable in response to system pressure in said circuit exceeding a predetermined value for directing oil from the circuit to the associated servo motor, a pair of lines interconnecting said branch lines with said control line and each having a check valve to block flow from the control line to the branch line, said displacement control valve having a first position for maintaining said pump in stroke at a desired displacement and having a second neutral position, said displacement control valve having means to block fluid communication between said servo motors in said first position and means to place said servo motors in communication with each other and out of communication with the control line and drain connections in said neutral position.

13. A pressure override control as defined in claim 12 wherein each of said branch lines has a flow restriction to limit the initial flow surge when one of said pressure relief valves opens and said displacement control valve in said first position connecting one of said branch lines to said drain connection and with a flow restriction in said connection.

14. A servo controlled pumping apparatus including a variable displacement pump having a displacement control member which is positioned in accordance with variations in an input signal by a servo mechanism having a pair of opposed servo motors and including a displacement control valve, and characterized by override control means which responds to the discharge pressure of the pump and acts on the displacement control member in opposition to and concurrently with the servo mechanism, the override means serving to overcome the positioning effort of the servo mechanism and move the displacement control member in the displacement-reducing direction as needed to limit the pressure to a predetermined level, and said displacement control valve having a neutral position interconnecting said servo motors in a closed circuit whereby any fluid flow to said servo mechanism resulting from a malfunction in said override means is applied to both said servo motors and is therefore ineffective to move the displacement control member.

15. The apparatus defined in claim 14 in which the displacement control member is movable to opposite sides of a zero displacement position to cause the pump to discharge through one or the other of a pair of ports, as well as to vary delivery rate; and the override control means responds to the pressure at either one of said ports.

* * * * *